(12) United States Patent
Groening et al.

(10) Patent No.: US 6,502,517 B1
(45) Date of Patent: Jan. 7, 2003

(54) ARRANGEMENT FOR OPERATING A TRANSPORTATION SYSTEM WITH A MAGNETIC LEVITATION VEHICLE

(75) Inventors: Ingolf Groening; Gerhard Henneberger, both of Aachen; Manfred Klittich, Eschborn; Horst Wunderlich, Eutingen; Anton Seelig, Floersheim, all of (DE)

(73) Assignee: Alstom Anlagen-und Automatisierungstechnik GmbH, Frankfurt (DE)

( * ) Notice: Subject to any disclaimer, the term of this patent is extended or adjusted under 35 U.S.C. 154(b) by 0 days.

(21) Appl. No.: 09/600,585

(22) PCT Filed: Jan. 13, 1999

(86) PCT No.: PCT/EP99/00259
§ 371 (c)(1),
(2), (4) Date: Jan. 24, 2001

(87) PCT Pub. No.: WO99/36287
PCT Pub. Date: Jul. 22, 1999

(30) Foreign Application Priority Data

Jan. 19, 1998 (DE) .......................................... 198 01 586

(51) Int. Cl.⁷ ................................................ B60L 13/04
(52) U.S. Cl. ...................... 104/281; 104/282; 104/290; 104/283; 104/286
(58) Field of Search ................................. 104/281, 282, 104/283, 284, 286, 290, 293; 318/135; 310/12

(56) References Cited

U.S. PATENT DOCUMENTS

| | | | | |
|---|---|---|---|---|
| 3,845,720 A | * | 11/1974 | Bohn et al. | 104/148 MS |
| 3,850,109 A | * | 11/1974 | Thornton | 104/148 SS |
| 4,587,472 A | * | 5/1986 | Steinmetz et al. | 104/290 |

FOREIGN PATENT DOCUMENTS

| | | | |
|---|---|---|---|
| EP | 0179188 A2 | * | 4/1986 |
| EP | 0335719 A2 | * | 4/1989 |
| JP | 0179188 | | 4/1986 |
| JP | 0335719 | | 10/1989 |

OTHER PUBLICATIONS

Kiyoshi, Jan. 1988, Patent Abstract of Japan, p. 1.*

* cited by examiner

Primary Examiner—S. Joseph Morano
Assistant Examiner—Frantz F. Jules
(74) Attorney, Agent, or Firm—Harness, Dickey & Pierce, P.L.C.

(57) ABSTRACT

The invention relates to an arrangement for operating a transportation system with a magnetic levitation vehicle, in which the inventive arrangement consists of an integrated transmission system including a power transmission system for inductive transmission of electric power, a linear motor for transmission of motive power and a magnetic levitation system for transmission of a carrying force and/or a lateral guiding force.

26 Claims, 5 Drawing Sheets

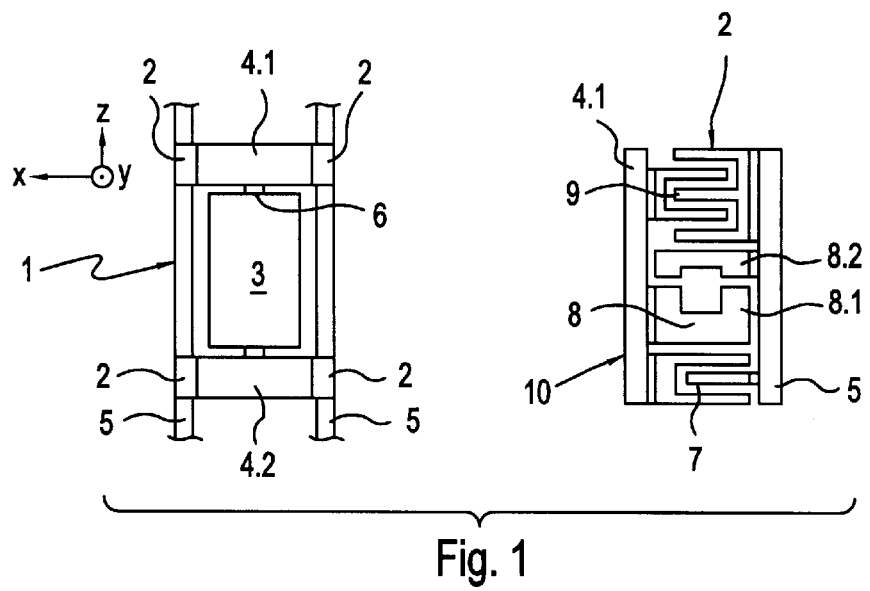
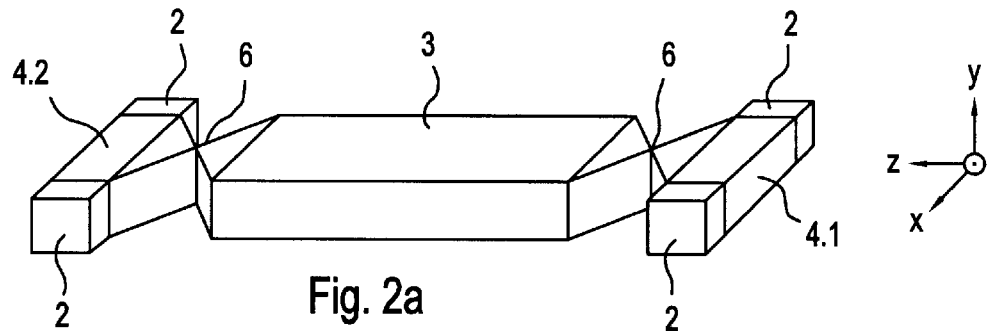
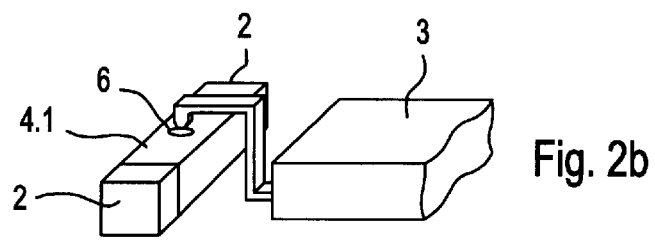

US 6,502,517 B1

ARRANGEMENT FOR OPERATING A TRANSPORTATION SYSTEM WITH A MAGNETIC LEVITATION VEHICLE

This application is the national phase under 35 U.S.C. §371 of PCT International Application No. PCT/EP99/00259 which has an International filing date of Jan. 18, 1999, which designated the United States of America.

BACKGROUND OF THE INVENTION

1. Field of the Invention

This invention relates to an arrangement for operating a transport system with a magnetically levitated vehicle according to the preamble of the of the independent claim.

2. Related Art

Magnetic levitation or maglev technology permits non-contact and thus wear-free support of both rotating and linearly moving parts. One of the main goals of using maglev technology in the field of mass transport is to replace contact of the wheel with the track at high speeds, but in the field of conveyor technology, especially important properties include the absence of abrasion, the low noise levels and the reduced wear. Therefore, such a conveyor system is suitable for use in the environment around people, for applications with high hygienic demands, e.g., in the food industry and in the pharmaceutical and medical industries, and for use in clean rooms or in rooms where this is a risk of explosion. The ratio of the load conveyed to the empty weight of the vehicle is also of greater relevance in conveyor technology than in mass transport.

One important factor is the energy required for levitation of a vehicle.

Because of the high speeds in transporting people, this energy can be applied through the drive power. However, speeds of only a few meters per second used in conveyor technology are too low for this purpose. Therefore, the energy required for levitation must be made available on the vehicle itself.

European Patent No. 580,107 A1 describes a magnetically levitated transport system, where a maglev vehicle is advanced on the track by means of a linear motor. This system has the disadvantage that the arrangement takes up a large volume and is mechanically complicated.

The object of this invention is to provide an arrangement for operating a transport system with a magnetically levitated vehicle which permits a compact, space-saving and thus inexpensive design.

This object is achieved through the features of the independent claim. More extensive advantageous embodiments can be derived from the additional claims and the description.

This invention makes it possible to replace complex mechanical systems with non-contact systems for energy transfer and/or for transfer of driving forces as well as carrying forces and lateral traction for a magnetically levitated vehicle in particular. It permits integration of a mobile non-contact system.

The arrangement according to this invention for operating a transport system with a magnetically levitated vehicle has an integrated transmission system with a power transmission system for inductive transmission of electric power, a linear motor for transmitting a driving power and a maglev system for transmitting carrying forces and/or lateral traction. This arrangement has the advantage that similar conditions apply for individual components in the integrated transmission system for a dynamic response in driving operation, and similar conditions also apply with regard to mechanical air gaps with magnets and/or mechanical tolerances. The structural design is simple in an advantageous manner, and in particular, a modular design of an integrated transmission system is possible according to this invention. Other advantages include simple assembly of the component systems, the simplification achieved because there are no electric connections or connection systems, and also through the simplified maintenance effort in replacing any components.

In a preferred embodiment, the transmission system is arranged at outer corners of the mobile system of the maglev vehicle in particular. The advantage is the symmetrical arrangement of the transmission system, so that a magnetically levitated vehicle can be used in a flexible manner; in particular, comparable conditions apply for travel forward and in reverse. This simplifies the task of reversing the direction of travel of the maglev vehicle.

It is especially advantageous to provide a bogie to hold the transmission system. The integrated transmission system is preferably provided on two exterior sides of a bogie connected to a car body, where the bogie is preferably connected to the car body by a joint which can rotate about a vertical axis with respect to the direction of travel. An arrangement of one bogie in front of the car body and one bogie behind it in the direction of travel is especially advantageous. It is advantageous to arrange the transmission system on two end faces of the bogie which is connected to a car body of the maglev vehicle. An advantageous arrangement consists of providing a ball joint between the bogie and the car body. This makes it possible to achieve especially good turning radius in a vertical plane. This is advantageous for use of the transport system according to this invention for operation along routes with an ascending or descending gradient.

An advantageous refinement of the arrangement according to this invention provides for the mobile component system of the magnetically levitated system, in particular the maglev vehicle, to have two separate, individually controlled magnets in combination with the bogie with the ball joint. This permits an advantageous dynamic driving response in turning a curve in particular.

In another advantageous refinement of the arrangement according to this invention, the transmission system has transmission heads that are fixedly connected to the maglev vehicle and are designed in a U shape facing the outside of the maglev vehicle, with the legs of the U shape lying vertically one above the another and facing outward. It is especially advantageous if the U-shaped sections project into sections of parts of the stationary transmission system. This permits the use of passive shunts in driving operation of the transport system in an especially advantageous manner.

Another advantageous refinement of this invention consists of arranging active, controlled subsystems of the magnetically levitated system and the linear motor in or on the mobile maglev vehicle, preferably using electric power transmitted by power transmission systems and information processing by a control unit. The advantage is that individual driving operation of each mobile system is possible at any time at any location along the route. It is especially advantageous that independent operation of several mobile systems over the same route and/or the same route segment is possible.

Another advantageous embodiment according to this invention provides for the magnetic levitation system to have a controllable mechanical air gap. A means of control is preferably provided in the direction of the acting normal force, in particular in the y coordinate. The advantage of this measure is the greatly reduced wear plus the possibility of designing the mechanical supporting elements merely as a safety device and/or an auxiliary device for the mobile maglev vehicle.

It is especially advantageous that means provided for controlling a mechanical air gap of the magnetic levitation system are also used at the same time to control a mechanical air gap of a linear motor and/or power transmission system. This advantageous combination permits a non-contact transmission systems with a minimized air gap. As a result, the weight and dimensions of the individual transmission systems of the integrated transmission system can be reduced with essentially comparable performance data according to known solutions to this problem. Therefore, the transmittable power and/or driving force can be increased in an advantageous manner while keeping the same dimensions and weights.

In an especially advantageous refinement of the arrangement according to this invention, the linear motor is arranged on the maglev vehicle in such a way that the center of gravity of the linear motor and the center of gravity of the entire transmission system, in particular taking into account a load weight, are located in a plane (x-z plane) parallel to the direction of movement of the maglev vehicle. Thus, the influence of interference moments in acceleration and deceleration of the maglev vehicle is advantageously minimized due to a minimized lever arm in combination with the effect of the driving force.

An especially advantageous arrangement of the magnetic levitation system on the mobile system and in the integrated transmission system is designed so that the air gap plane (y coordinate) of the magnetic levitation system is located above the center of gravity of the complete mobile system of the transmission system, taking into account a typical load weight. This avoids in an advantageous manner the behavior of an upright pendulum with a labile equilibrium for the transport system.

It is advantageous to arrange the magnetic levitation system, the linear motor and the power transmission system vertically one above the other. This yields essentially an optimum arrangement with minimized interference moments due to the driving force while avoiding an unwanted pendulum behavior with a labile equilibrium and/or achieves a minimum structural height of the arrangement. It is especially advantageous if, in addition, the transmission heads are arranged compactly without any mechanical distance. This avoids the large structural height of the arrangement which would otherwise be necessary.

Another advantageous refinement according to this invention provides for the power transmission system, the magnetic levitation system and the linear motor to be arranged vertically one above the other and stationary parts of the power transmission system and magnetic levitation system on the one hand and the transmission heads of the magnetic levitation system and the linear motor to be arranged directly side by side on the other hand. The advantage of this is that an advantageous low structural height can again be achieved.

The magnetic levitation system has a magnet with a magnetic yoke, where both the magnet and the magnetic yoke have a U-shaped cross section, with the legs of the U-shaped sections facing one another. The advantage of this arrangement is that it yields effective lateral traction, which is achieved due to the shaping. This stabilizes the mobile system.

Another advantageous embodiment consists of the fact that the integrated transmission system has a mechanical guidance system which is provided to control the direction in a passive shunt in the traffic lane of the transport system. Lateral tracking is preferably provided in the form of a pair of rollers of the mechanical guidance system, with the pair of rollers engaging in the groove formed by the U-shaped magnetic yoke of the magnetic levitation system. The pair of rollers is preferably located on the bogie of the mobile maglev vehicle and can be arranged in pairs either in front of or behind the mounting position of the transmission heads (z coordinate), or one roller of a pair may be mounted in front of the mounting position of the transmission heads and the other roller mounted behind it.

In another advantageous embodiment, magnets of the magnetic levitation system are arranged in pairs opposite one another, with a mobile part of a transmission head mounted on the maglev vehicle preferably extending over a stationary part of the power transmitter.

It is advantageous to provide means to permit regulation of the air gap of the magnetic levitation system at a variable air gap size, so that normal forces of the linear motor are taken into account in this regulation as support for the levitation. This is advantageously made possible by the two-sided design of the magnetic levitation system, because it is possible to adjust the forces in a positive direction and in a negative direction (y coordinate). Thus, in particular it is possible to minimize losses and thus also minimize the power demand of the system.

An advantageous design of the magnetic levitation system is such that means are provided to permit flux guidance of the magnetic flux running perpendicular to the direction of travel of the maglev vehicle. This permits an advantageous reduction in eddy current losses and an increase in advantageous lateral traction.

BRIEF DESCRIPTION OF THE DRAWINGS

This invention is described in greater detail below on the basis of embodiments illustrated in the figures, which show:

FIG. 1: a top view and a detailed view of an arrangement according to this invention;

FIG. 2: a detailed view of two joint arrangements;

DETAILED DESCRIPTION OF THE PREFERRED EMBODIMENTS

Figure 3:
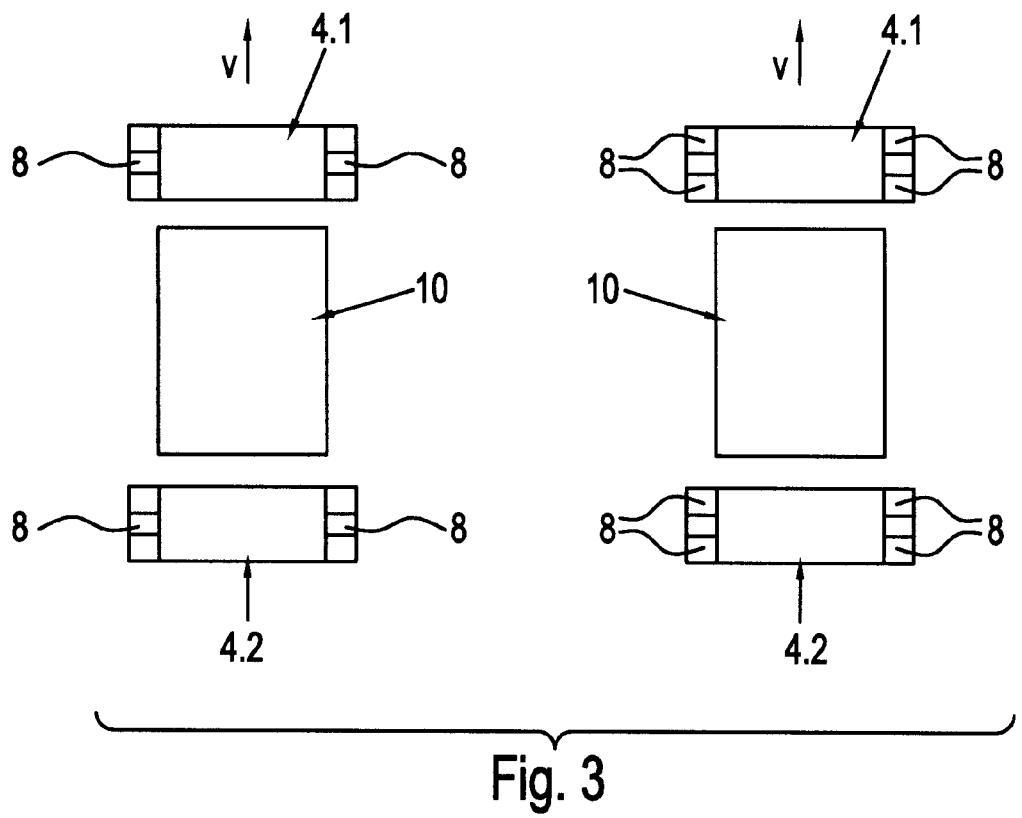
FIG. 3: two arrangements for magnets.

FIG. 1 illustrates the arrangement of a transport system according to this invention with integrated transmission systems. A maglev vehicle is driven by linear motors that operate without contact, and it is supplied with electric power over an inductive transmission system. A preferred integrated transmission system consists of a non-contact power transmission system for inductive transmission of electric power, a linear motor for transmission of the driving force and a magnetic levitation system whose mobile subsystem is the maglev vehicle and which has stationary parts in the traffic lane.

The left half of the figure shows a top view of a transport system 1 with four integrated transmission systems 2, a car body 3 with a front bogie 4.1 and a rear bogie 4.2 arranged on a maglev vehicle moving along a track 5. No details of the maglev vehicle are shown here. Bogie 4.1, 4.2 is connected by a joint 6 to car body 3. An integrated transmission system 2 is arranged symmetrically on all four corners of the car at the lateral ends of the bogie 4.1, 4.2. The vehicle can travel along the z coordinate. In the simplest case, joint 6 may be a pin which allows it to turn horizontally, i.e., to rotate about the y axis, preferably with stops to limit the motion. Vertical turning is suppressed, and this ensures that the bogie 4.1, 4.2 and the car body 3 will lie essentially in one plane. Another advantageous design of a joint 6 is a ball joint which allows rotation in the horizontal, vertical and azimuthal directions. Each of these rotational movements can be limited by stops, independently of one another. The air gap between the bogie and the car body as well as the so-called stiff length of the joint are advantageous in cornering in the vertical direction.

The detailed view on the right side of FIG. 1 shows the details of an integrated transmission system 2 in cross section. A part of track 5 can be seen at the left, with a bogie 4.1, 4.2 at the right. The lower element is a linear motor 7 with a supporting magnetic system 8 arranged above it and a power transmission head 9 arranged above that. Linear motor 7, supporting magnetic system 8 and transmission head 9 each have a stationary component arranged on the track 5 and a mobile component connected to the mobile system over the bogie 4.1, 4.2. The mobile components of the transmission heads 9 have a U-shaped profile which projects into the E-shaped profile of the stationary counterpart. The supporting magnetic system 8 has a bottom part 8.1 and a magnetic yoke 8.2, each of which is designed in a U shape and aligned with their legs facing. The linear motor 7 has a U-shaped profile on the mobile part extending over the profile on the stationary side. The design of the integrated transmission system 2 is very compact and allows use of passive shunts in the system in an advantageous manner.

FIG. 2 shows diagrams of two embodiments of a joint 6. The top part of the figure shows one pin joint arranged between bogies 4.1, 4.2 on both sides of the car body 3, and the bottom part shows a ball joint between a bogie 4.1 or 4.2 and car body 3. For reasons of stability and because of the greater number of degrees of freedom, the ball joint necessitates a two-magnet arrangement of supporting magnets 8, because tilting of the bogie 4.1, 4.2 vertically, e.g., when the vehicle accelerates, could not be prevented by a single magnet arrangement. The arrangement with a pin joint, however, can be implemented only with a single magnet arrangement for cost reasons. The rigidity of the vehicle is then sufficient for stabilization. However, an arrangement with two magnets is also possible.

FIG. 3 illustrates in greater detail a single magnet arrangement and a two-magnet arrangement of the supporting magnets in a top view. The left half of the figure illustrates the single magnet arrangement, which is advantageous in combination with a pin joint 6 between a bogie 4.1, 4.2 and a car body 3. The maglev vehicle 10 has four supporting units with supporting magnets 8, each composed of a supporting magnet with a bottom part 8.1 and a magnetic yoke 8.2. They are arranged on the lateral ends of bogie 4.1, 4.2. The right half of the figure shows a two-magnet arrangement, where the magnets are part of the integrated transmission system 2. Each magnet preferably has its own air gap sensor for determining the size of the air gap and its own current controller.

FIG. 4 shows advantageous embodiments of supporting magnet 8. An advantageous supporting magnet 8 is an electromagnet, as illustrated in FIG. 4a. This maglev principle makes use of the attraction of an electromagnet to a ferromagnetic yoke, formed by track 5 in this figure. The electromagnet is energized by coils through which an electric current flows. Since this arrangement is unstable, the air gap must be measured with air gap sensors and stabilized by a suitable coil current. Another advantageous supporting magnet 8 is formed by a hybrid magnet. In this arrangement, the basic excitation is handled by permanent magnets, which are connected to an electromagnet. This allows magnetic levitation of a vehicle in a power-saving type of operation.

Essentially, a vehicle can be guided on a track by mechanical forces or suitable construction elements such as rolls, skids or magnetic forces. Both active and passive guidance are possible.

With active electromagnetic guidance, other electromagnets are also used in addition to supporting magnets 8 to keep the vehicle on the track or between the guide rails. The lateral distances from the guide rails are preferably measured here, and the guidance magnets are regulated accordingly.

Passive guidance is an inexpensive and lightweight alternative. If an electromagnet suspended beneath a track is deflected laterally, this results in a force pulling it back into the center position. This principle is known as reluctance, resulting in weakly damped vibrations. A maglev vehicle can be guided advantageously by reluctance forces, with lateral movements being possible. To permit stable operation, the possibilities of lateral movement are limited, preferably by roll stops. Since these roll stops are not used continuously, in contrast with mechanical guidance rollers, they can be designed with a lighter weight. It is especially advantageous to provide the supporting track with a groove running in the direction of travel to increase the reluctance forces, thus increasing the lateral restoring forces, in particular approximately doubling them.

Figure 4A:
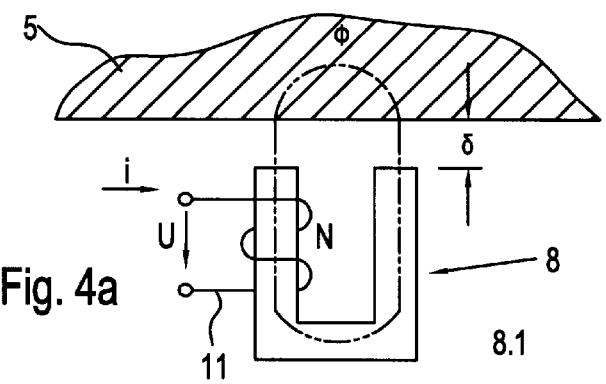
FIG. 4: different embodiments of supporting magnets.
Figure 4B:
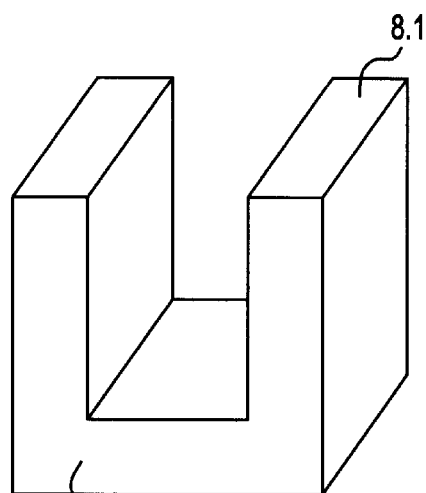

FIG. 4b shows an electromagnet as bottom part 8.1 of the supporting magnet 8. It has a U-shaped yoke 8.3 with operating coils 11 wound around both legs of the yoke. The operating coils are not shown here. A two-quadrant controller is sufficient for operation because the force depends only on the absolute value of the coil current.

Figure 4C:
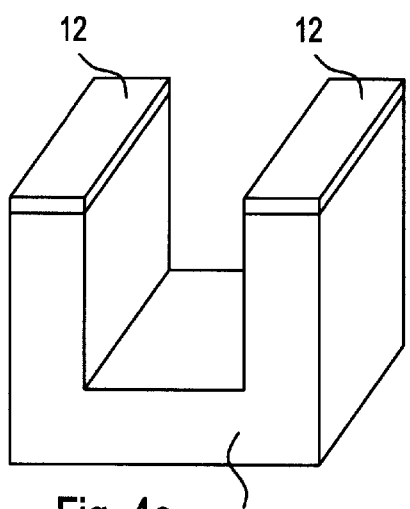

FIG. 4c shows a hybrid magnet. In this embodiment, a permanent magnet material 12 is applied to the pole faces of yoke 8.3 of the electromagnet, with the legs of yoke 8.3 in turn carrying the operating coils 11 (not shown here). The thickness of the permanent magnets is preferably such that the hybrid magnet applies a predetermined force for a given air gap between the pole face and the yoke without any current flowing through operating coil 11. To change the resulting force, the hybrid magnet is additionally energized by a current flowing through operating coils 11 or is de-excited. A four-quadrant controller is advantageous for this purpose.

Figure 4D:
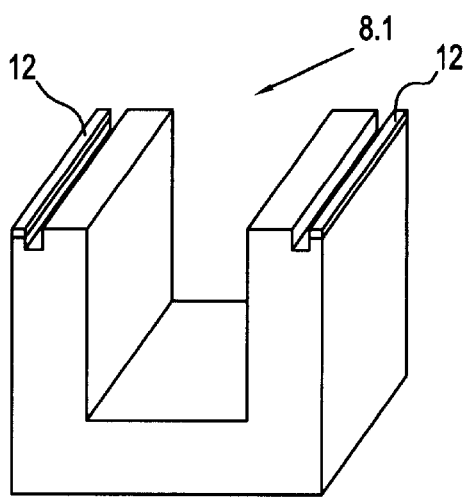

FIG. 4d shows another advantageous embodiment of a supporting magnet 8. The advantage of an electromagnet in the form of a small magnetically active air gap and a hybrid magnet in the form of a force without a current flow can be utilized with a so-called combination hybrid magnet. The pole faces of a yoke 8.3 of an electromagnet are only partially covered with a permanent magnet material 12. In this figure, the permanent magnet material 12 is applied to the outer areas of the pole faces parallel to the groove of the yoke 8.3. Since the permanent magnet material 12 is in contact with the electrically conducting yoke 8.3 on two sides, magnetic short circuits occur there. To reduce these short circuits, it is advantageous to provide an additional groove in the pole face parallel to the permanent magnet material 12. Depending on the design of the permanent magnet 12, a two-quadrant controller may be sufficient to supply power to the electromagnet.

Figure 4E:
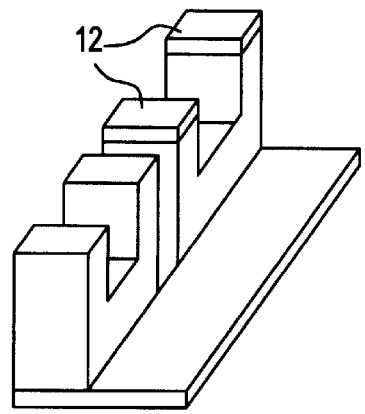

Another advantageous embodiment of a supporting magnet 8 is shown in FIG. 4e in the form of a two-circuit arrangement. The supporting system 8 is composed of an electromagnet and a permanent magnet arranged mechanically side by side or in series.

With all these arrangements, a magnetic yoke 8.2 which is designed in a U shape is used to advantage. The respective segment member of track 5 is preferably designed with a groove which also increases the lateral traction in an advantageous manner. The segment member must carry the same flux as a bottom part 8.1 of supporting magnet system 8. It is advantageous for the magnetic yoke 8.2 to be made of laminated iron so that the eddy current losses can be reduced.

Figure 5A:
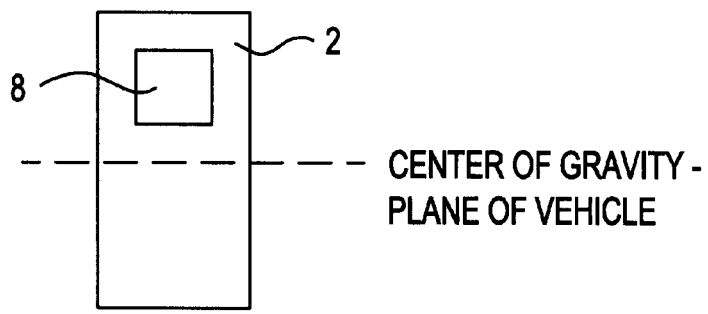
FIG. 5: an advantageous arrangement of centers of gravity.
Figure 5B:
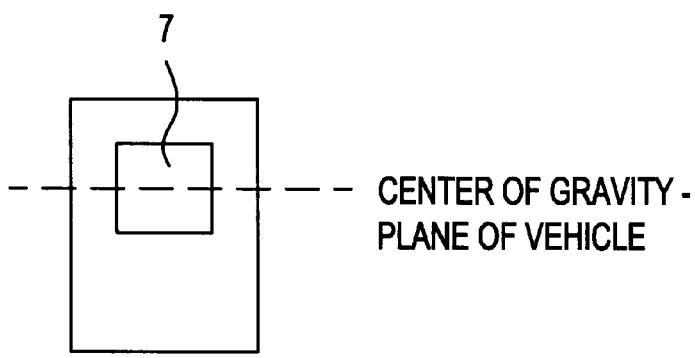
Figure 5C:
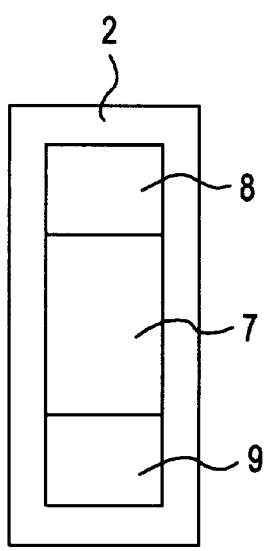

To make the overall system arrangement as stable as possible, it is advantageous to provide the design of the system so that the plane of the air gap of the magnetic levitation system is located above the center of gravity of the complete mobile system. This is illustrated in FIG. 5. It is advantageous to include the effect of a typical load weight in the maglev vehicle. FIG. 5b shows a favorable arrangement of the center of gravity of the linear motor 7. It is advantageous if the center of gravity of the linear motor 7 lies approximately in the same plane as the center of gravity of the integrated transmission system. The system is then especially stable.

Figure 6:
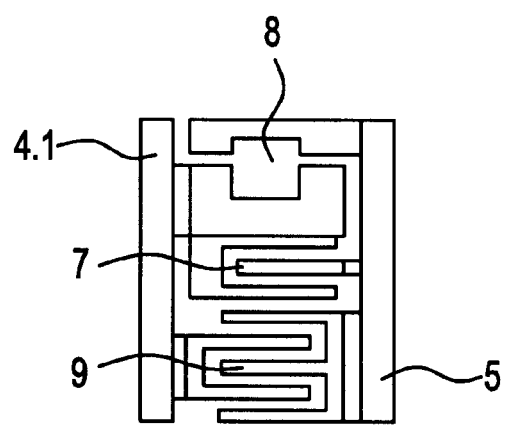
FIG. 6: a detailed view of an embodiment of the integrated transmission system.

FIG. 6 shows an especially compact arrangement of the integrated transmission system 2. The order of the individual transmission systems is different here in comparison with the embodiment in FIG. 1. The power transmission head 9 is arranged here at the bottom of the integrated transmission system, the linear motor 7 is in the middle, and the magnetic levitation system 8 is at the top.

Figure 7:
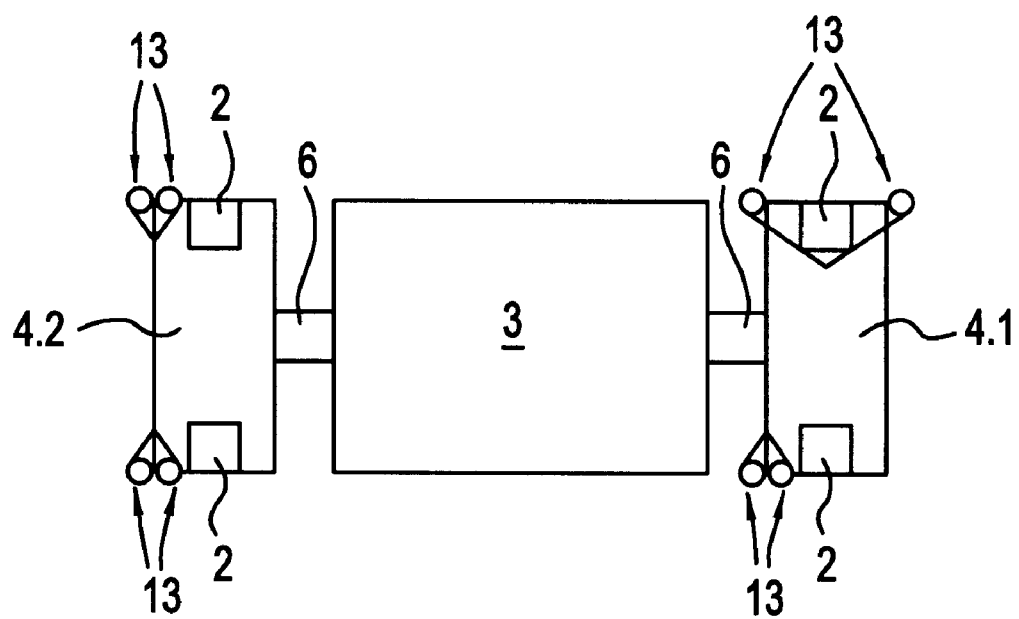
FIG. 7: a maglev vehicle with a guidance device.

With the embodiment of the integrated transmission system 2 according to FIG. 6, an advantageous stable arrangement with mechanical guidance can be achieved. This is illustrated in FIG. 7. Despite the use of a magnetic supporting system, additional rollers 13 are advantageous for the bogie 4.1, 4.2 for safety reasons. First, rollers 13 are provided on the bottom side of the bogie 4.1, 4.2 to allow the vehicle to drive through a passive shunt. These rollers 13 can also be used at the same time to support the vehicle in the event of a power failure or some other system error. In addition, rollers 13 can also be provided on the top side of the bogie 4.1, 4.2, because then it is impossible for the vehicle to fall down in the event of a power failure in any load case because of linear motor 7 and the use of a hybrid magnet in the supporting magnet system 8. Furthermore, rollers 13 are advantageous for driving through shunts, because the frictional forces of rollers 13 can be greater than the remaining reluctance force of a deflected supporting magnet. These rollers can also be used in cornering to increase the possible curve speed. Rollers 13 are mounted on the sides of bogies 4.1, 4.2 in the area of transmission systems 2. This embodiment is especially suitable for mechanical control of the direction in a passive shunt. A pair of rollers 13 engages in the groove forming the U-shaped magnetic yoke 8.2 of the magnetic levitation system. The arrangement of rollers 13 may be arranged in pairs either in front of or behind the car body 3 or with one roller 13 in front and one behind the car body 3.

An especially advantageous flux guidance of the magnetic levitation system is perpendicular flux guidance relative to the direction of travel (z direction). The type of flux guidance has an influence on the eddy current losses occurring with movement in the direction of travel and on the supporting forces and the lateral traction of the system. Since the supporting function of supporting magnets 8 is of primary importance, and the normal force is greater than the reluctance force, the supporting magnet 8 is preferably designed so that the normal force of the magnet 8 is the supporting force and the reluctance force is provided for guidance. If the magnetic flux is directed normal to the direction of movement (perpendicular flux guidance), there are advantages in contrast with flux guidance in the direction of movement (parallel flux guidance). First, the eddy current losses in magnetic yoke 8.3 are lower than with parallel flux guidance, because the change in flux is lower with a comparable displacement of the magnet 8 in the direction of movement. Secondly, the yoke surface projecting out of the track 5 is greater with perpendicular flux guidance than with parallel flux guidance due to the lateral displacement of the yoke 8.2. This larger surface is linked to the change in magnetic field energy which is proportional to the restoring force with lateral displacement. It is also possible to increase the lateral traction by providing a groove in track 5.

What is claimed is:

1. Arrangement for operating a transport system with a track-guided magnetically levitated vehicle, the arrangement comprising: a linear motor (7) for transmission of a driving power and a magnetic levitation system (8, 8.1, 8.2, 8.3) for transmitting supporting forces and/or lateral traction wherein active, controlled subsystems of the magnetic levitation system (8, 8.1, 8.2, 8.3) are arranged on the magnetically levitated vehicle (10), and wherein means provided for controlling a mechanical air gap of the magnetic levitation system is also provided, wherein, a power transmission system (9) is provided for inductive transmission of electric power, that the active, controlled subsystems of the linear motor (7) are arranged in or on the magnetically levitated vehicle (10), that the power transmission system (9), which is in or of the controlled subsystems of the magnetically levitated vehicle (10), supplies electric power to the magnetic levitation system (8, 8.1, 8.2, 8.3) and the linear motor (7), and that the means, which is for controlling the mechanical air gap of the magnetic levitation system (8, 8.1, 8.2, 8.3), at the same time is provided for controlling a mechanical air gap of the linear motor (7) and/or the power transmission system.

2. Arrangement according to claim 1, wherein a transmission system (2) is arranged at the outer corners of the magnetically levitated vehicle (10).

3. Arrangement according to claim 2, wherein a bogie (4.1, 4.2) is provided to hold the transmission system (2).

4. Arrangement according to claim 2, wherein the transmission system (2) is arranged on the outer sides of a bogie (4.1, 4.2) which is connected to a car body (3) of the magnetically levitated vehicle (10).

5. Arrangement according to claim 2, wherein the transmission system (2) has transmission heads (9) which are fixedly connected to the magnetically levitated vehicle (10) and are designed in a U shape on the outsides of the magnetically levitated vehicle (10), so that the legs of the U shape lie vertically one above the other and face outward.

6. Arrangement according to claim 2, wherein the transmission system (2) is arranged on two lateral end sides of a bogie (4.1, 4.2) which is connected to a car body (3) of the magnetically levitated vehicle (10).

7. Arrangement according to claim 2, wherein that the profiles of transmission heads (9) project from parts of transmission system (2) which are fixedly connected to the magnetically levitated vehicle (10) and extend into the profiles of stationary parts of the transmission system (2).

8. Arrangement according to claim 2, wherein the linear motor (7) is arranged on the transmission system (2) in such a way that the center of gravity of the linear motor (7) and the center of gravity of the entire transmission system (2) both lie approximately in a plane parallel to one direction of movement of the magnetically levitated vehicle (10).

9. Arrangement according to claim 2, wherein the linear motor (7) is arranged on the magnetically levitated vehicle (10) in such a way that the center of gravity of the linear motor (7) and the common center of gravity of the magnetically levitated vehicle (10), parts of the transmission system (-2) mounted on the magnetically levitated vehicle (10) and a load mass lie approximately in a plane parallel to one direction of movement of the magnetically levitated vehicle (10).

10. Arrangement according to claim 2, wherein an air gap plane of the magnetic levitation system (8, 8.1, 8.2, 8.3) is integrated into the transmission system (2) so that it is arranged above the center of gravity of the transmission system (2).

11. Arrangement according to claim 2, wherein an air gap plane of the magnetic levitation system (8, 8.1, 8.2, 8.3) is integrated into the transmission system (2) in such a way that it is arranged above the common center of gravity of the magnetically levitated vehicle (10) and parts of the transmission system (2) and the linear motor (7) mounted on the magnetically levitated vehicle (10).

12. Arrangement according to claim 2, wherein the integrated transmission system (2) has a guidance system (13) which is provided for direction control in a passive shunt and/or lateral guidance.

13. Arrangement according to claim 12, wherein the guidance system has a pair of rollers (13), where the pair of rollers (13) engages in a groove which is a U-shaped magnetic yoke (5, 8.2).

14. Arrangement according to claim 1, wherein a joint (6) is provided between the bogie (4.1, 4.2) and a car body (3).

15. Arrangement according to claim 1, wherein a bogie (4.1, 4.2) is arranged in front of and behind a car body (3) of the magnetically levitated vehicle (10) in the direction of travel of the magnetically levitated vehicle (10).

16. Arrangement according to claim 1, wherein a mobile subsystem (8.1, 8.2) of the magnetic levitation system (8, 8.1, 8.2, 8.3) has two independent, separately controlled single magnets (8.1, 11) for applying the supporting force.

17. Arrangement according to claim 1, wherein the magnetic levitation system (8, 8.1, 8.2, 8.3), the linear motor (7) and the power transmission system (9) are arranged vertically one above the other.

18. Arrangement according to claim 1, wherein the magnetic levitation system (8, 8.1, 8.2, 8.3), the linear motor (7) and the power transmission system (9) are arranged vertically one above the other, with the magnetic levitation system (8) being arranged above the linear motor (7).

19. Arrangement according to claim 1, wherein parts of magnetic levitation system (8) mounted on the magnetically levitated vehicle (10) and the linear motor (7) are arranged close together without any mechanical distance between them.

20. Arrangement according to claim 1, wherein the magnetic levitation system (8, 8.1, 8.2, 8.3), the linear motor (7) and the power transmission system (9) are arranged vertically one above the other, with the magnetic levitation system (8) being arranged at the top, the linear motor (7) in the middle and the power transmission system (9) at the bottom.

21. Arrangement according to claim 1, wherein in a vertical arrangement, the power transmission system (9) is arranged at the top, the magnetic levitation system (8, 8.1, 8.2, 8.3) is in the middle and the linear motor (7) is arranged at the bottom, so that stationary parts of the power transmission system (9) and the magnetic levitation system (8, 8.1, 8.2, 8.3) on the one hand and parts of the magnetic levitation system (8) and the linear motor (7) mounted on the magnetically levitated vehicle (10) on the other hand are arranged close together without any mechanical distance between them.

22. Arrangement according to claim 1, wherein the magnetic levitation system (8, 8.1, 8.2, 8.3) has a magnet (8.1) with a yoke (8.3) having a magnetic yoke (8.2), where the magnetic yoke (8.2) has a U-shaped cross section whose legs are facing the magnet (8.1).

23. Arrangement according to claim 1, wherein magnets (8.1, 8.3) of the magnetic levitation system (8) are arranged in pairs opposite one another.

24. Arrangement according to claim 1, wherein a part of the magnetic levitation system (8) mounted on the magnetically levitated vehicle (10) extends over a part of the magnetic levitation system (8) arranged in a stationary mount on the track (5).

25. Arrangement according to claim 1, wherein normal forces of the linear motor (7) are provided as support for the levitation and are taken into account in controlling the air gap.

26. Arrangement according to claim 1, wherein a magnetic yoke (8.2) is aligned with the part of a magnetic levitation system (8.1, 8.3) mounted on the magnetically levitated vehicle (10) so that the magnetic flux is guided perpendicular to the direction of travel of the magnetically levitated vehicle (10).

* * * * *